UNITED STATES PATENT OFFICE.

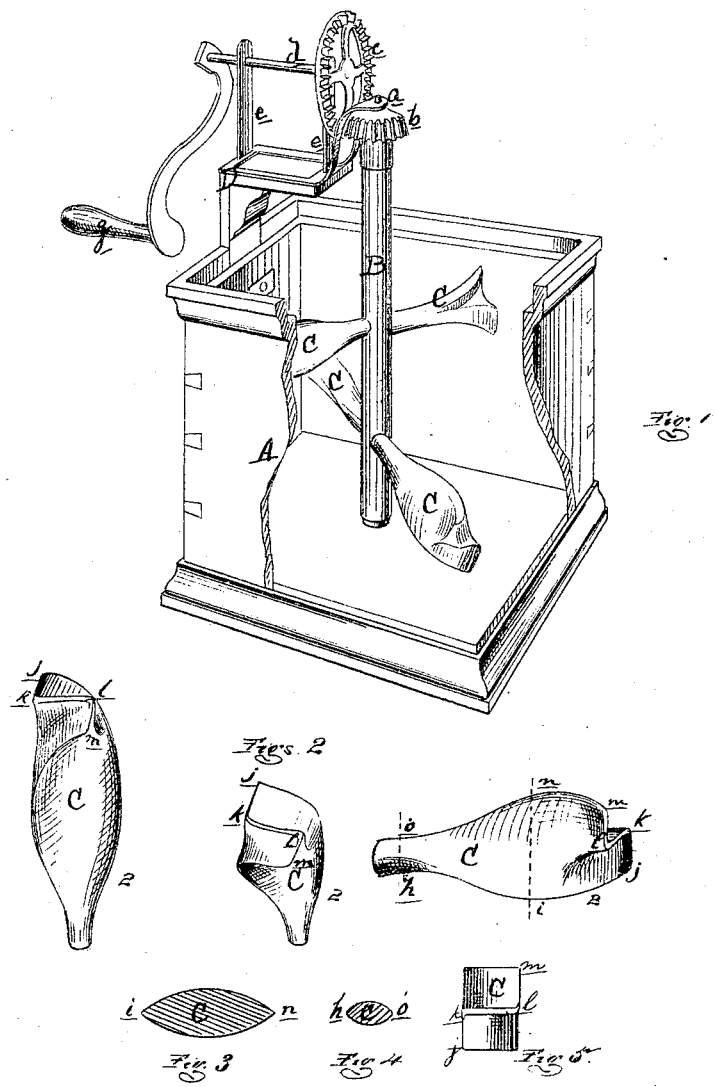

GEORGE SPAYD, OF ALMA, MICHIGAN.

IMPROVEMENT IN CHURNS.

Specification forming part of Letters Patent No. 118,826, dated September 12, 1871.

*To all whom it may concern:*

Be it known that I, GEORGE SPAYD, of Alma, in the county of Gratiot and State of Michigan, have invented a new and useful Improvement in Churns and Churn-Dashers; and I do declare that the following is a true and accurate description thereof, reference being had to the accompanying drawing and to the letters of reference marked thereon, and being part of this specification, in which—

Figure 1 is a perspective view of the churn with a portion of two sides broken away to show the internal arrangement. Fig. 2 are detached views of the dasher. Fig 3 is a vertical sectional view of the dasher at the line $k\ l$ in Fig. 2. Fig. 4 is a vertical sectional view of the dasher at the line $i\ n$ in Fig. 2. Fig 5 is an end elevation of the dasher.

In the accompanying drawing like letters designate like parts.

The nature of this invention relates to an improvement in churns and churn-dashers, whereby the butyraceous oil or fatty matter is more easily separated from the cream and collected after such separation. This invention consists in the peculiar shape of the radial arms or dashers set at right angles with the line of the upright shaft, when a strong boiling motion is produced in the cream in the churn, thereby thoroughly exposing the cream to the air and breaking the globules containing the butyraceous oil or fatty matter, thus freeing the butter from the other components of the cream, and then by a reverse motion collecting all these particles of butter into a solid mass ready to be taken from the churn; and it further consists in the combination of the various parts as more fully hereinafter set forth.

In the accompanying drawing, A is the body of the churn, in the center of the bottom of which is placed a step (not shown) upon which the upright shaft B, pivoted in the spider $a$, is rotated by means of the beveled pinion $b$, which works in the spur-wheel $c$, which is fixed on the shaft $d$, which is supported by and journaled on the standards $e f$ on the arm D, and turned by the crank $g$, the arm D being attached to the side of the churn body A in any convenient place and manner. The shaft B bears the radial arms or dashers C at right angles with the line of the shaft, which arms are, near the shaft, nearly round, but coming to an edge at $h$ near the shaft, which edge is carried outward and downward to $i$, thence with a curve rearward to $j$, then upward to $k$, then forward, at right angles with the line $j\ k$, to $l$, thence upward at right angles with the line $k\ l$ to $m$, thence rearward and downward to $n$, and thence downward and inward to $o$ near the shaft, so that the vertical section of the radial arm at $h\ o$ is an ellipse slightly sharpened at the ends. The vertical section at $i n$ is a very flat ellipse with very sharp ends, and the outer end is composed of two right-angles on the opposite sides, and at each end of the line $k\ l$, thus producing such edges, surfaces, and angles as will give the greatest commotion to the cream in the churn. The sides of the churn are fastened together by any suitable means, and are inserted in the rabbeted groove $p$ in the bottom, where they are securely fastened so as to render the churn water-tight.

What I claim as my invention, and desire to secure by Letters Patent, is—

1. The radial arms or dashers C, constructed, arranged, and operating substantially as described and shown, for the purposes set forth.

2. The combination of the body A, shaft B, radial arms C, pinion $b$, spur-wheel $c$, spider $a$, shaft $d$, standards $e\ f$, crank $g$, and arm D, substantially as and for the uses above set forth.

GEORGE SPAYD.

Witnesses:
 JOHN E. DAVIDSON,
 WM. YERINGTON.